United States Patent [19]
Richardson

[11] Patent Number: 5,927,027
[45] Date of Patent: Jul. 27, 1999

[54] CONSERVATORY ROOFS

[76] Inventor: Christopher Richardson, 4 Willow Drive, Clitheroe, United Kingdom, BB7 9FG

[21] Appl. No.: 09/004,386

[22] Filed: Jan. 8, 1998

[30] Foreign Application Priority Data

Mar. 5, 1997 [GB] United Kingdom ............... 9704512

[51] Int. Cl.⁶ ..................................................... E04B 7/18
[52] U.S. Cl. ................................... 52/200; 52/13; 52/72; 52/90.1; 52/461; 52/DIG. 17
[58] Field of Search ...................... 52/13, 41, 43, 52/57, 72, 200, 461, 463, 464, DIG. 17, 90.1

[56] References Cited

U.S. PATENT DOCUMENTS

| 2,213,402 | 9/1940 | Lowry ............................. 52/463 X |
| 3,139,958 | 7/1964 | De Witt ............................. 52/13 X |
| 3,344,564 | 10/1967 | Siegal ............................. 52/13 X |
| 3,394,526 | 7/1968 | Engelbrecht ...................... 52/464 X |
| 3,911,632 | 10/1975 | Bryfogle et al. ..................... 52/13 |
| 4,114,330 | 9/1978 | Sukolics ........................... 52/461 X |
| 4,385,850 | 5/1983 | Bobath ............................ 52/461 X |

FOREIGN PATENT DOCUMENTS

| 9002093 | 4/1992 | Netherlands ......................... 52/13 |
| 225211 | 7/1992 | United Kingdom .................... 52/13 |

Primary Examiner—Carl D. Friedman
Assistant Examiner—Winnie Yip
Attorney, Agent, or Firm—Howell & Haferkamp, L.C.

[57] ABSTRACT

A valley construction for a conservatory roof comprises a pair of wing members connected together, each wing member providing at opposite sides of the valley locations for attachment of glazing bars.

13 Claims, 2 Drawing Sheets

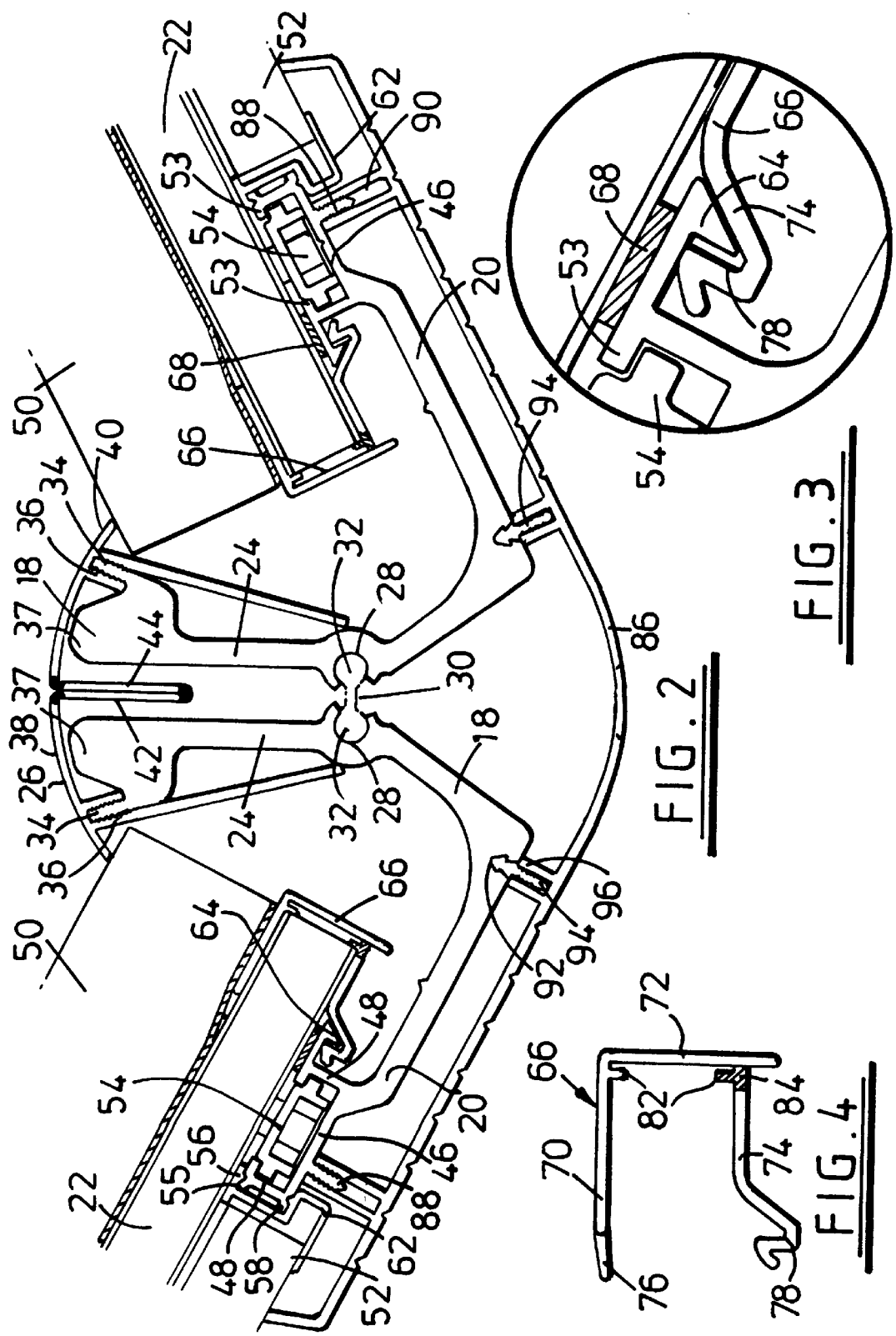

CONSERVATORY ROOFS

This invention concerns conservatory roofs.

When a conservatory roof is constructed for cover a conservatory that includes an internal corner i.e. the conservatory is L-shaped in plan, such a roof includes a valley where two roof sections meet. Rain water falling on the valley can be problematic unless the valley is constructed so as to be watertight. In particular it is undesirable to have any areas in the valley construction wherein water can collect and build up. Any build up of water in the valley construction can lead to corrosion and leakage. Furthermore, it is desirable that the valley construction be as simple as possible requiring little or no drilling for bolt or screw holes to reduce construction times and locations where water ingress is possible.

An object of this invention is to provide a valley construction for a conservatory roof.

According to this invention there is provided a valley construction for a conservatory roof comprising a pair of wing members connected together, each wing member providing at opposite sides of the valley locations for attachment of glazing bars.

The wing members preferably further provide at upper ends thereof locations for attachment of a capping over the valley. The wing members still further preferably provide locations for attachment of an undercladding on the underside of the valley.

The wing members preferably have two facets, the first of which is preferably adapted to be connected to a corresponding facet of another said wing member in mirror image relationship. The second facet of a wing member is preferably adapted to provide said locations for attachment of glazing bars. The two wing members are preferably connected in such a way that they are movable relative to each other whereby the angles of the other facets can be adjusted according to the slope of the roof. The back of the first facets preferably includes a part circular channel to receive slidingly one end of a connector whose ends are shaped correspondingly whereby the connector and the facet of the wing member can pivot relative to each other.

The locations for attachment of glazing bars preferably comprise channels in the second facets of the wing members, which can receive connectors preferably slidingly to which glazing bars can be connected.

The second facets of the wing members preferably also have means for retaining end caps for glazing panels laid on the wing members. To that end it is preferable that a flange extend from a side of the channel towards the first facet and said flange has a part locatable in a part of the end cap, such as a barb.

The end cap is preferably of channel section to be pushed onto a glazing panel end. The end cap preferably has a top wall, a base and a bottom wall and the bottom wall is preferably resiliently deformable and has a location for said part of the flange of the wing member to locate in. Preferably as the end cap is pushed onto the glazing panel its bottom wall is deflected past the barb until the barb snaps into a slot depression, groove or the like in the bottom wall of the end cap.

This invention will now be further described by way of example only, with reference to the accompanying drawings, in which:

FIG. 2 is a section or line AA of FIG. 1;

FIG. 3 shows detail of part of FIG. 3; and

FIG. 4 is a end view of a glazing panel end cap used in the roof valley construction.

Figure 1:
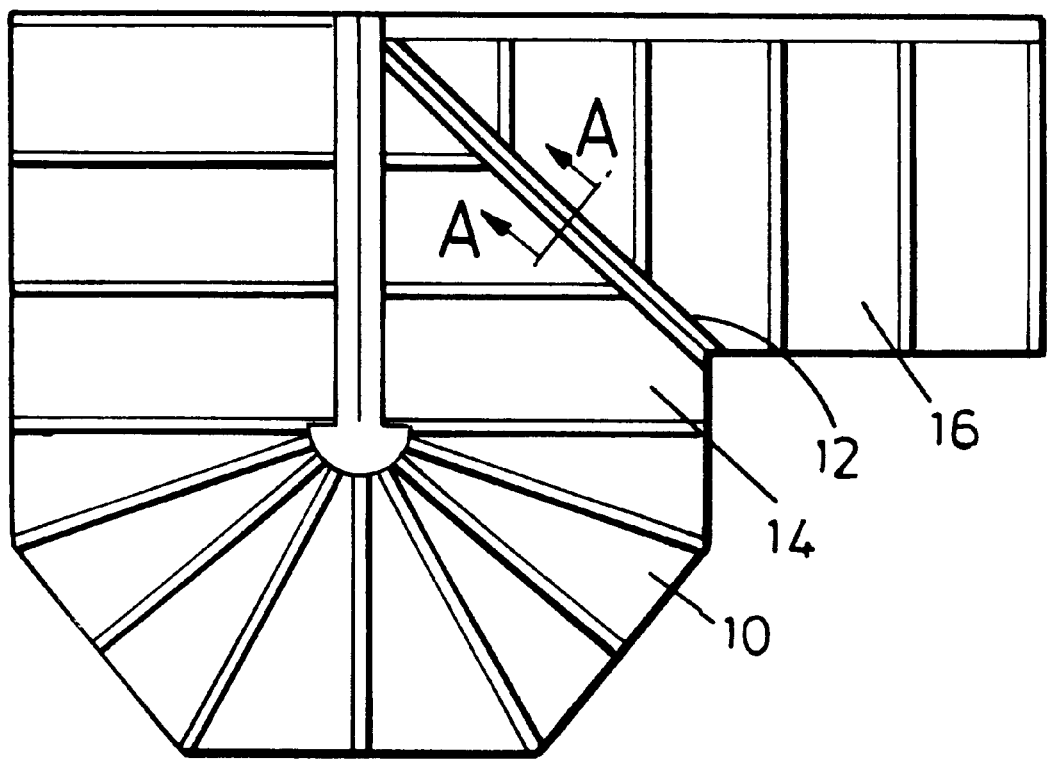
FIG. 1 shows in plan a conservatory roof having a roof valley part.

Referring to the accompanying drawings a typical L-shaped conservatory 10 has a valley 12 where roof sections 14 and 16 meet.

FIG. 2 is a section on line AA of FIG. 1 and illustrates the make up of the valley. The valley 12 comprises two wing members 18 of aluminium. The wing members 18 are secured at each end to the conservatory roof ridge and to the conservatory eaves respectively. The wing members have a first limb 20 that is adapted to have glazing panels 22 mounted thereon and a second limb 24 that is adapted to be connected to a second limb of another wing member and to receive a capping 26 for the valley.

The second limb 24 of the wing members are angled at about their mid points whereas on the opposite face to that from which the first limb extends is a channel 28 to receive a connector 30, whereby two wing members can be connected back to back. The channel 28 is generally circular in section and the connector has correspondingly shaped ends 32, whereby each end of the connector is slidable into a channel of a wing member and the wing member and the connector are relatively pivotable about said connections. In that way the relative angle of the two wing members can be varied to accommodate different roof angles.

At their upper ends the second limbs 24 are enlarged at 37 and extending upwardly from a side of said enlargements are barbs 34 onto which corresponding formations 36 on the underside of the capping 26 can be pushed to secure the capping in place. The capping 26 comprises a top in four flexible connected parts 38, 40, 42 and 44. The outer parts 38 and 40 are gently arcuate and intended to form a more or less continuous arcuate top. The intermediate top parts 42 and 44 are flexibly connected at one end to part 38 or 40 and at their other ends to each other so that they normally lie side by side below the parts 38 and 40. However, the flexible nature of the connection between the parts of the top means that variations in the relative positions of the two wing members can be accommodated without affecting the integrity of the capping.

The first limbs of the wing member have at their remote ends a channel 46 formed therein to receive means for connecting glazing bars thereto. The glazing bars support the roofing panels therebetween which are held in place by upper and lower cappings 50, 52 retained on the glazing bars. The cappings and the glazing panels conceal the glazing bars in the drawings. The channel 46 has side walls 48 and inward returns 53 for retaining glazing bar connectors 54 in the channels, which connectors are slid into position along the channels. The glazing bar connectors 54 permit screw or bolt type connection through glazing bars thereinto.

From the channel side wall top edges also there are outwardly extending flanges 55, 56. On the one hand extending away from the wing members there is a flange 55 with a longitudinal notch 56 which is matched by a similar extension 58 of the channel base to provide locations for snap fitting a drip profile 62 thereonto that traps condensation in the lower capping and directs it to a gutter at the roof eaves. On the opposite side of the channel the flange 56 extension has a barb 64 on its underside for location of a plastics end cap 66 on the glazing panel 22. The glazing panel sits generally on the first limb 20 of a wing but with a strip of foam tape 68 on the flange and a top part of the drip profile 62 in between.

The end cap 66 comprises a channel section member having a top wall 70, a base 72 and a bottom wall 74. The top wall 70 has on its remote end a co-extruded rubber or elastomeric material gasket 76 to seal against the top of the glazing panel. The bottom wall 74 is resiliently deformable and has a longitudinal slot 78 formed therein with a sloping lead in edge 80, whereby the channel section can be pushed onto the glazing panel and snap fit over the barb 64 to secure the end cap in place.

The end cap has interally thereof from the top and bottom walls 70, 74 small ribs 82 that act as spacers to prevent the end cap base coming into contact with the glazing panel end to leave a ventilation gap therebetween. The bottom wall 74 of the end cap also has a series of apertures 84 along its length adjacent its position with the base of the end cap to provide drainage passages.

The valley has undercladding 86 secured thereto. The undercladding 86 is of plastics material and is secured to the underside of the valley firstly near each end by means of barbed ribs 88 on the underside of each wing member below their channels 46 and slot formations 90 on the undercladding top side which are push-fit onto the barbed ribs 88. Secondly, just prior to the elbow of each wing member 18 is a longitudinal slot 92 to receive a plastics barb strip 94 which extends from the slot 92 and onto which another slot formation 96 on the top side of the cladding is a push fit.

I claim:

1. A roof structure forming a valley between roof sections of a roof, the roof structure comprising:

first and second wing members, each wing member having first and second limbs that are oriented at an angle relative to each other, the first limb of each wing member having a location for attachment of a roof section thereto;

a connection between the second limbs of the first and second wing members, the connection positions the first limbs of the first and second wing members at an angle between the first limbs and the connection enables relative movement between the first and second wing members, whereby the angle between the first limbs of the first and second wing members a adjusted according to a desired slope of roof sections to be attached at the locations for attachment on the first limbs of the first and second wing members;

the connection between the send limbs of the first and second wing members includes a channel in each of the second limbs and a connector inserted into the channels of the second limbs, the connector enabling pivoting movement of the first and second wing members relative to the connector and relative to each other.

2. The roof structure of claim 1, further comprising:

a first roof section attached to the location for attachment of a roof section on the first limb of the first wing member and a second roof section attached at the location for attachment of a roof section on the first limb of the second wing member.

3. The roof structure of claim 2, wherein:

the first and second roof sections are each comprised of glazing bars for supporting glazing panels, and the glazing bars are attached at the locations for attachment of a roof section on the first limbs of the first and second wing members.

4. The roof structure of claim 2, wherein:

the second limb of each of the first and second wing members has a location for attachment of a capping to extend over a valley formed between the first and second roof sections.

5. The roof structure of claim 2 wherein:

the first and second wing members each have a location for attachment of an undercladding to extend beneath a valley formed between the first and second roof sections.

6. The roof structure of claim 1, wherein:

the first and second wing members have the same dimensions and the connection between the second limbs of the first and second wing members positions the first and second wing members in a mirror image relationship to each other.

7. The roof structure of claim 3, wherein:

the glazing bars of each of the first and second roof sections have connectors thereon and the locations for attachment of a roof section on the first limbs of the first and second wing members are channels that are shaped to receive the connectors therein.

8. The roof section of claim 2, further comprising:

end caps are attached to each of the first and second roof sections and the first limbs of the first and second wing members have means for retaining the end caps on the first and second roof sections, respectively.

9. The roof structure of claim 8, wherein:

the means for retaining the end caps on the first and second roof sections includes a barb that extends from each of the first limbs of the first and second wing members, and the barbs engage with the end caps and retain the end caps on the first and second roof sections.

10. The roof structure of claim 8, wherein:

the end caps are formed as channel sections and are pushed over edges of the first and second roof sections.

11. The roof structure of claim 8, wherein:

each end cap has a top wall, a base and a bottom wall.

12. The roof structure of claim 9 wherein:

each of the end caps has a top wall, a base and a bottom wall and the bottom wall is resiliently deformable relative to the top wall and base, and the bottom wall has a location for receiving the barbs of the first limbs to retain the end caps on the first and second roof sections.

13. The roof structure of claim 9, wherein:

each of the end caps has a top wall, a base and a bottom wall and the bottom walls of the end caps have slots for receiving the barbs of the first limbs which snap into the slots to retain the end caps on the first limbs.

* * * * *